United States Patent
Zhou

(10) Patent No.: US 11,451,641 B2
(45) Date of Patent: Sep. 20, 2022

(54) METHOD FOR ENABLING SMART DEVICE TO ACCESS NETWORK, NETWORK ACCESS METHOD, APPARATUS, DEVICE, SYSTEM AND COMPUTER-READABLE STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 78 days.

(21) Appl. No.: 16/927,453

(22) Filed: Jul. 13, 2020

(65) Prior Publication Data

US 2021/0134468 A1 May 6, 2021

(30) Foreign Application Priority Data

Nov. 6, 2019 (CN) .......................... 201911077396.9

(51) Int. Cl.
*H04L 67/12* (2022.01)
*G06Q 30/06* (2012.01)
*G06Q 50/28* (2012.01)
*G16Y 10/45* (2020.01)
*H04L 67/00* (2022.01)

(52) U.S. Cl.
CPC ......... *H04L 67/34* (2013.01); *G06Q 30/0609* (2013.01); *G06Q 30/0641* (2013.01); *G16Y 10/45* (2020.01); *H04L 67/12* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 9,455,965 B2* | 9/2016 | Nix | H04B 5/0037 |
| 9,935,962 B2* | 4/2018 | Burns | G06Q 30/0236 |
| 10,764,934 B2* | 9/2020 | Ren | H04W 48/16 |

(Continued)

FOREIGN PATENT DOCUMENTS

| | | |
|---|---|---|
| CN | 108464026 A | 8/2018 |
| CN | 109391699 A | 2/2019 |
| EP | 3300299 A1 | 3/2018 |

OTHER PUBLICATIONS

Machine translation of Qu, CN109391699A, translation dated Dec. 28, 2021. (Year: 2021).*

(Continued)

*Primary Examiner* — Nicholas D Rosen
(74) *Attorney, Agent, or Firm* — Syncoda LLC; Feng Ma

(57) ABSTRACT

A method for enabling a smart device to access a network can be applied to a server of an online shopping system, the method including: receiving a purchase order for the smart device submitted by a designated user, and determining the smart device shipped corresponding to the purchase order; and in response to that the purchase order includes at least one network configuration information, sending a write signal, the write signal is used to notify writing of the network configuration information to the smart device, so as to enable the smart device to access a network according to the network configuration information.

14 Claims, 7 Drawing Sheets

(56) References Cited

U.S. PATENT DOCUMENTS

| | | | |
|---|---|---|---|
| 2011/0063994 A1* | 3/2011 | Nix .................. | H04B 5/0037 |
| | | | 370/254 |
| 2016/0087838 A1* | 3/2016 | Kim .................. | H04L 41/12 |
| | | | 709/224 |
| 2016/0295625 A1* | 10/2016 | Zhang ................ | H04W 76/14 |
| 2016/0330776 A1* | 11/2016 | Ren .................. | H04W 12/08 |
| 2017/0208070 A1* | 7/2017 | Burns ................ | H04L 63/0876 |
| 2018/0048632 A1 | 2/2018 | Cammarota et al. | |
| 2019/0297495 A1 | 9/2019 | Aggarwal et al. | |
| 2021/0136667 A1* | 5/2021 | Zhou ................. | H04W 48/16 |

OTHER PUBLICATIONS

LinguaLinx Language Solutions, human translation of Qu, CN109391699A, translation dated Jan. 19, 2022. (Year: 2022).*
Extended European Search Report in Application No. 20190536.1, dated Jan. 28, 2021.

* cited by examiner

METHOD FOR ENABLING SMART DEVICE TO ACCESS NETWORK, NETWORK ACCESS METHOD, APPARATUS, DEVICE, SYSTEM AND COMPUTER-READABLE STORAGE MEDIUM

CROSS-REFERENCE TO RELATED APPLICATIONS

This application claims priority to Chinese Patent Application No. 201911077396.9 filed on Nov. 6, 2019, the disclosure of which is hereby incorporated by reference in its entirety.

BACKGROUND

Artificial Intelligence (AI) and Internet of Things (IoT), or AIoT, can refer to intelligent interconnections of everything. For example, the IoT can be enabled by AI, big data, and cloud computing. An important application of AIoT is smart homes.

SUMMARY

Various embodiments of the present disclosure provide a method for enabling a smart device to access a network, a network access method, an apparatus, a device, a system, and a medium.

According to a first aspect of the present disclosure, there is provided a method for enabling a smart device to access a network, which is applied to a server of an online shopping system, the method includes:

receiving a purchase order for the smart device submitted by a designated user, and determining the smart device shipped corresponding to the purchase order; and in response to the purchase order which includes at least one network configuration information, sending a write signal, the write signal is used to notify writing of the network configuration information to the smart device, so as to allow the smart device to access to a network according to the network configuration information.

According to a second aspect of the present disclosure, there is provided a network access method, which is applied to a smart device, the network access method includes:

detecting whether a network configuration information is stored; and in response to detecting that the network configuration information is stored, accessing a network according to the stored network configuration information.

According to a third aspect of the present disclosure, there is provided an online shopping system, wherein the online shopping system includes a client-side and a server-side, the client-side is configured for making a designated user to submit a purchase order for a smart device to the server-side;

the server-side is configured for receiving the purchase order for the smart device submitted by the designated user and determining the smart device shipped corresponding to the purchase order;

the server-side is further configured for, in response to the purchase order which includes at least one network configuration information, sending a write signal, and the write signal is used to notify writing of the network configuration information to the smart device, so as to allow the smart device to access to a network according to the network configuration information.

According to a fourth aspect of the present disclosure, there is provided an apparatus for enabling a smart device to access a network, the apparatus includes:

a determining module, configured to receive a purchase order for the smart device submitted by a designated user and determine the smart device shipped corresponding to the purchase order; and a sending module, configured to, in response to the purchase order which includes at least one network configuration information, send a write signal, and the write signal is used to notify writing of the network configuration information to the smart device, so as to allow the smart device to access a network according to the network configuration information.

According to a fifth aspect of the present disclosure, there is provided a network access apparatus, the apparatus includes:

a detecting module, configured to detect whether network configuration information is stored; and a network access module, configured to, in response to detecting that the network configuration information is stored, access a network according to the stored network configuration information.

According to a sixth aspect of the present disclosure, there is provided a computer device comprising a processor and a memory for storing processor-executable instructions, wherein the processor is configured to perform following steps:

receiving a purchase order for the smart device submitted by a designated user, and determining the smart device shipped corresponding to the purchase order; and in response to the purchase order which includes at least one network configuration information, sending a write signal, the write signal is used to notify writing of the network configuration information to the smart device, so as to allow the smart device to access to a network according to the network configuration information.

According to a seventh aspect of the present disclosure, there is provided a smart device comprising a processor and a memory for storing processor-executable instructions, wherein the processor is configured to perform following steps:

detecting whether a network configuration information is stored; and in response to detecting that the network configuration information is stored, accessing a network according to the stored network configuration information.

According to an eighth aspect of the present disclosure, there is provided a computer-readable storage medium having a computer program stored thereon, and when the program is executed by a processor, following steps are implemented:

receiving a purchase order for the smart device submitted by a designated user, and determining the smart device shipped corresponding to the purchase order; and in response to the purchase order which includes at least one network configuration information, sending a write signal, the write signal is used to notify writing of the network configuration information to the smart device, so as to allow the smart device to access to a network according to the network configuration information; or detecting whether a network configuration information is stored; and in response to detecting that the network configuration information is stored, accessing a network according to the stored network configuration information.

It should be understood that the above general description and the following detailed description are only exemplary and explanatory, and do not limit the present disclosure.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION

Figure 1:
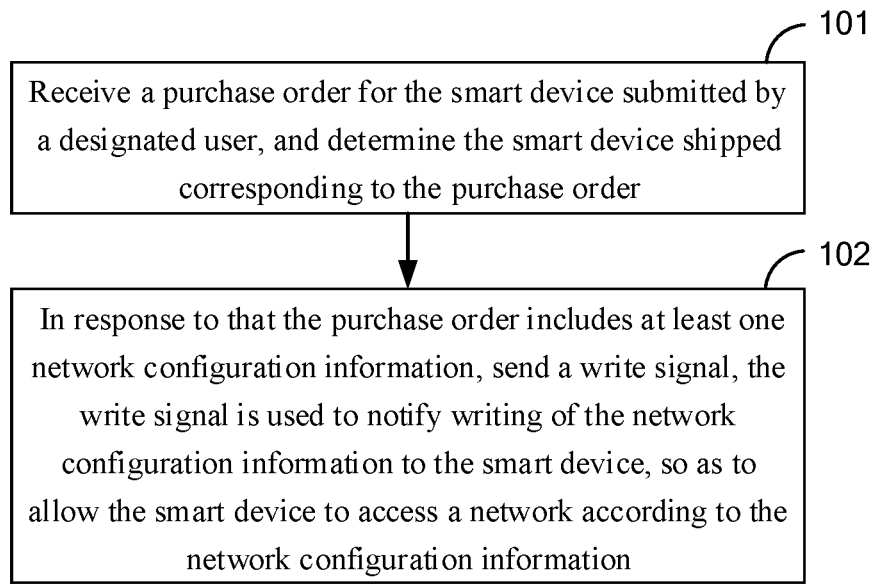
FIG. 1 shows a flowchart of a method for enabling a smart device to access a network according to an embodiment.

The technical solutions in the embodiments of the present disclosure will be described clearly and completely in conjunction with the drawings in the embodiments of the present disclosure below. Obviously, the described embodiments are only a part of the embodiments of the present disclosure, but not all the embodiments. Based on the embodiments in the present disclosure, all other embodiments obtained by a person of ordinary skill in the art without creative efforts fall within the protection scope of the present disclosure.

Embodiments will be described in detail herein, examples of which are shown in the drawings. When the following description refers to the accompanying drawings, unless otherwise indicated, the same numerals in different drawings represent the same or similar elements. The embodiments described in the following embodiments do not represent all embodiments consistent with the present disclosure. Rather, they are merely examples of apparatuses and methods consistent with some aspects of the present disclosure as detailed in the appended claims.

The terminology used in this disclosure is for the purpose of describing particular embodiments only, and is not intended to limit this disclosure. The singular forms "a," "an" and "the" used in this disclosure and the appended claims are also intended to include plural form unless the context clearly indicates other meanings. It should also be understood that the term "and/or" as used herein refers to and includes any or all possible combinations of one or more associated listed items.

It should be understood that although the terms first, second, third, etc. may be used to describe various information in this disclosure, the information should not be limited to these terms. These terms are only used to distinguish same type of information from each other. For example, without departing from the scope of the present disclosure, the first information may also be referred to as second information, and similarly, the second information may also be referred to as first information. Depending on the context, the word "if" as used herein may be interpreted as "while" or "when" or "in response to a determination that . . . ."

Two approaches can often be adopted for solving initial network assignment of a smart device.

One approach is through Soft access point (AP), that is, a smart device or a control terminal is simulated as a soft access node, so that the smart device and the control terminal are possible to connect point to point, and then exchange necessary information required to access a network, such as Service Set Identification (SSID) and authentication password for Wireless Local Area Network (WLAN), etc. However, the Soft AP needs to switch back to WLAN mode after establishing the soft access node, which takes a long time, and requires user to establish a connection with the soft access node by manual operations.

Another approach includes a combination of Bluetooth and WLAN. When a smart device is turned on, it uses Bluetooth beacon to broadcast, so that the control terminal can discover the smart device, and then the smart device and control terminal quickly establish a connection via Bluetooth. After that, user manually enters configuration information of the WLAN assigned by the control terminal. Then the configuration information is transmitted to the smart device, so that the smart device is assigned to WLAN. This method is faster than Soft AP, but still requires the user to search for device and configures it manually.

A method for enabling a smart device to access a network, a network access method, an apparatus, a device, a system, and a medium can be provided according to some embodiments of the present disclosure.

A smart device needs to acquire network configuration information necessary to access a network when it is first powered on, such as a Service Set Identification (SSID) and an authentication password of the wireless network WLAN or Wi-Fi, before the smart device can access the network. In the existing related technologies, it is generally required that a user operates a control terminal to establish a communication connection with the smart device, and manually enters the network configuration information of the network, then confirms sending it to the smart device. The smart device accesses the network according to the received network configuration information. However, the entire process requires manual operation by the user, which is time-consuming.

To solve the problem that the user may need manual operations to make the smart device to access the network, various embodiments of the present disclosure provide a method for enabling a smart device to access a network, which can be applied in various application scenarios of the Internet of Things, such as intelligent home, intelligent transportation, intelligent security and intelligent medical treatment, which are not limited in this disclosure. The smart device may be a device with intellectualized functions in various application scenarios of the Internet of Things, for example, intelligent home appliance devices, intelligent medical devices, intelligent cars, intelligent home devices, intelligent door locks, etc., and the present disclosure does not make limitations about this. The method for enabling a smart device to access a network can also be applied in various application scenarios of accessing other networks, and the present disclosure does not make specific limitations about this.

In a scenario, a user can purchase a smart device through an online shopping platform. The online shopping platform is equipped with an online shopping system, which includes a server-side and a client-side. The server-side provides services through at least one server and can communicate with a plurality of client-sides. The user can become a client-side by registering a user account on the online shopping platform, and can buy various kinds of commodities on the online shopping platform. The sales scope of the online shopping system is not limited herein.

According to a first aspect of the present disclosure, there is provided a method for enabling a smart device to access a network. FIG. 1 is a flowchart of a method for enabling a smart device to access a network according to an embodiment. The method is applied to a server of an online shopping system. As shown in FIG. 1, the method for enabling a smart device to access a network includes the following steps 101 to 102.

At the step 101, a purchase order for the smart device submitted by a designated user is received, the smart device shipped corresponding to the purchase order is determined.

In this step, a designated user can search for purchasable information related to a smart device by entering a keyword on the client-side of the online shopping system. When a smart device to be purchased is selected, a purchase of the smart device can be confirmed by submitting a purchase order. The server of the online shopping system can receive the purchase order submitted by the designated user via the client-side and can read order information in the purchase order. For example, the server can read an order number, type and model of the purchased commodity, a delivery address, and a contact method of the consignee, etc. In the online shopping system, the purchase order submitted by the user can correspond to an order number. The order number can describe the uniqueness of the purchase order. After the server receives the purchase order of the smart device submitted by the designated user, the server can determine the smart device delivered corresponding to the purchase order of the designated user before the smart device being shipped.

In some embodiments manner of the present disclosure, the smart device may have smart device identification, and the smart device identification may describe the uniqueness of the smart device. The server may determine the smart device identification of the smart device shipped corresponding to the purchase order of the designated user. For example, the smart device identification may be a product serial number of the smart device.

At the step 102, in response to the purchase order which includes at least one network configuration information, a write signal is sent, the write signal is used to notify writing of the network configuration information to the smart device, so as to allow the smart device to access to a network according to the network configuration information.

In this step, the network configuration information may be network configuration information of the network that the smart device purchased by the designated user needs to access in the future. The network configuration information may include Service Set Identifier (SSID) and authentication password. The smart device can access a network after obtaining the network configuration information.

When a designated user submits a purchase order for a smart device, he should fill at least one network configuration information into the order information of the purchase order, and the server determines whether there is the network configuration information by reading the order information. If the designated user's purchase order includes the network configuration information, the server sends the write signal in response to receiving the network configuration information sent by the designated user. The write signal is used to notify writing of the network configuration information to the smart device. Sending the write signal indicates that the network configuration information of the network which is going to access can be written to the smart device corresponding to the purchase order. In this way, when the smart device reaches a coverage range of said network and is powered on for the first time, the smart device is possible to access said network according to the written network configuration information.

For example, the server sends the write signal to the writing device, and after receiving the write signal, the writing device writes the network configuration information into the smart device shipped corresponding to the purchase order. In some embodiments of the present disclosure, the server also sends network configuration information and the smart device identification corresponding to the purchase order to the writing device. In this way, after receiving the write signal, the writing device determines a smart device to be written according to the received smart device identification, and writes the network configuration information to the smart device.

In some embodiments manner of the present disclosure, in a detail page of the purchase order of the online shopping system, an option of "whether to write the network configuration information of the network into the smart device" can be set to the client-side for choose. When the client-side receives "YES" of a user instruction, an input box for network configuration information is provided to the user for inputting. After the user enters the network configuration information and submits a purchase order, the server can read it out from the purchase order.

According to the above method provided by an embodiment of the present disclosure, when a designated user submits an order to purchase a smart device on an online shopping system, the server of the online system may determine the smart device to be shipped based on the purchase order of the designated user received. When the server detected that the purchase order submitted by the designated user includes network configuration information of a network that at least one smart device will access in the future, a write signal is sent to notify writing of the network configuration information to a corresponding shipped smart device. When the smart device reaches a delivery place on the purchase order, i.e., when the smart device reaches a coverage range of the network corresponding to the network configuration information, and the user starts the smart device (that is, the smart device is powered on for the first time), the smart device is capable to automatically access a network according to the written network configuration information. In this way, the smart device can automatically access a network after it is powered on for the first time, and the entire process does not require manual operation by the user, which is faster and more convenient.

Figure 2:
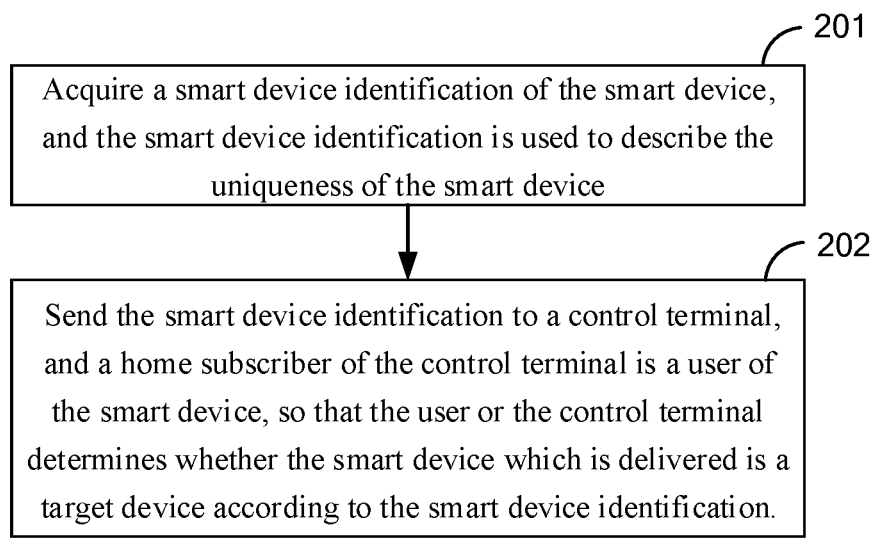
FIG. 2 shows a flowchart of a process for sending a smart device identification used in a method for enabling a smart device to access a network according to an embodiment.

FIG. 2 shows a flowchart of a process for sending a smart device identification used in a method for enabling a smart device to access a network according to an embodiment.

Based on the foregoing embodiment, this embodiment makes illustration by using an example of how a user of the smart device determines that the delivered smart device is a target device. As shown in FIG. 2, the method includes steps 201 to 202.

At step 201, a smart device identification of the smart device is acquired, and the smart device identification is used to describe the uniqueness of the smart device.

In this step, when the server determines the smart device shipped corresponding to the designated user's purchase order, the corresponding shipped smart device can be determined by the smart device identification, that is, the designated user's purchase order corresponds to the smart device identification of the smart device.

In some embodiments of the present disclosure, a person for shipping on the online shopping platform can send an order number of the purchase order and a smart device identification of the corresponding smart device to the server. For example, the person for shipping manually enters the order number and the smart device identification, so as to send them to the server.

In another example, the person for shipping scans labels of the purchase order and the smart device identification and sends them to the server. The labels may be a bar code label, a QR code label, a Radio Frequency Identification (RFID) label, or the like. After receiving the order number and the smart device identification, the server may use the order number and the smart device identification to generate a binding relationship, thus determining a smart device corresponding to the purchase order.

At the step 202, the smart device identification is sent to a control terminal, and a home subscriber of the control terminal is a user of the smart device, so that the user or the control terminal determines whether the delivered smart device is a target device according to the smart device identification.

The home subscriber of the control terminal may refer to a user of the control terminal. At the same time, the home subscriber can also be a user of the smart device. It can be understood that when the smart device is delivered, the user starts the smart device to complete an initialization setting. The server sends the determined smart device identification of the smart device to the control terminal of the user of the smart device. When the smart device is delivered, the user of the smart device or the control terminal further can determine whether the delivered smart device is a target device by the smart device identification received in advance, before the smart device is started, and if the delivered smart device is the target device, the smart device is started. Therefore, after the smart device is powered on, it can automatically access the network according to the written network configuration information.

In some embodiments of the present disclosure, the purchase order includes a second identification, and the second identification is used to describe the uniqueness of the home subscriber of the control terminal, and the step of sending the smart device identification to the control terminal includes: sending the smart device identification to the control terminal through the second identification. The purchase order submitted by the designated user may include the second identification of the control terminal of the user of the smart device. The second identification is sent to the server through the purchase order for the smart device submitted by the designated user, so that after acquiring the second identification, the server sends the smart device identification to the control terminal. That is to say, when the designated user submits the purchase order for the smart device, the second identification can be filled in order information.

When receiving the second identification, the server may feed the smart device identification of the smart device shipped corresponding to the purchase order back to the control terminal through the second identification. The fed backed smart device identification received by the control terminal may be stored locally, so that when the smart device is delivered, it can be invoked and quickly matched by the user of the smart device or the control terminal.

For example, the second identification may be a user account of the home subscriber of the control terminal on the online shopping system or a social account of the home subscriber, such as a phone number, an email address, a social software account, etc. The second identification can also be a user account of the operation service system carried on the control terminal. That is to say, the server directly sends the smart device identification to the control terminal through the second identification. For example, the second identification is a phone number, en email address, a social software account, etc. of the home subscriber of the control terminal.

In another possible implementation of the present disclosure, the smart device identification is uploaded by the server to the cloud service device through the second identification and the control terminal downloads the smart device identification from the cloud service device. That is to say, the server uploads the smart device identification to the cloud service device where the second identification is located, and the control terminal can download the smart device identification from the cloud service device through the second identification. In this way, the smart device identification can be uploaded to the cloud service device to control cloud storage space of home subscriber of the control terminal, which can avoid the loss and leakage of information and improve security. For example, in addition to describing the uniqueness of the home subscriber of the control terminal, the second identification also carries a domain name of the cloud service device. Therefore, the server is capable to access the cloud service device.

For another example, the second identification is a user account of the operation service system carried on the control terminal. The online shopping system is associated with the operation service system, so the server is possible to access the cloud service device of the operation service system. As another example, the online shopping system and the operation service system belong to same system, or the online shopping system is the own online shopping service of the operation service system. The server cluster of the operation service system includes the server and the cloud service device of the online shopping system, and the server of the online shopping system is capable to access the cloud service device.

In another possible implementation of the present disclosure, the designated user and the home subscriber of the control terminal may be same user or different users. Or, the designated user and the user of the smart device may be same user or different users.

For example, the designated user may be a user who purchased a smart device. If the designated user purchases the smart device for his own use, the home subscriber of the control terminal is the designated user who purchased the smart device. After acquiring the smart device identification shipped corresponding to the smart device, the server can feed it back to the designated user through the second identification, and the control terminal of the designated user can receive the smart device identification.

As another example, the designated user purchases the smart device for use by others, such as parents, friends, etc. That is to say, the home subscriber of the control terminal is not the designated user who purchased the smart device, and the second identification provided to the server by the designated user is a second identification of others. In this case, the server feeds the smart device identification back to the home subscriber of the control terminal through the second identification, and the control terminal can receive the smart device identification.

In order to improve the accuracy of the smart device identification received by the control terminal, In some embodiments of the present disclosure, the smart device identification is included in a first binding relationship of the smart device identification generated by the server and the second identification. That is to say, after receiving the second identification sent by the designated user and determining the smart device identification of the smart device shipped corresponding to the purchase order of the designated user, the server generates the first binding relationship by using the second identification and the smart device identification, that is, the home subscriber of the control terminal and the correspondingly shipped smart device generate a binding relationship, and the server feeds the first binding relationship back to the control terminal.

According to the received first binding relationship, the control terminal can determine whether an object to which the information is sent by the server controls the home subscriber of the control terminal by the first binding relationship. When the object controls the home subscriber of the control terminal, the first binding relationship is stored and the smart device identification from the first binding relationship is acquired. If the object does not control the home subscriber of the terminal, the first binding relationship is not stored, and it can be fed back to the server to send an error message.

In another possible implementation of the present disclosure, in addition to generating the binding relationship between the home subscriber of the control terminal and the smart device, the method further includes that in addition to sending the smart device identification to the control terminal, the server also sending a third identification. The third identification is comprised in the purchase order, and the third identification is used to describe the uniqueness of the control terminal.

For example, the server sends the smart device identification and the third identification to the control terminal through the second identification. The control terminal receives the third identification sent by the server to determine that an object to which the smart device identification is sent by the server is the control terminal itself.

For example, the third identification is a product serial number of the control terminal. That is to say, when the designated user submits the purchase order for the smart device, the third identification is also sent to the server. When the server feeds the smart device identification back to the control terminal, the third identification can also be sent, so that when the control terminal receives the smart device identification and the third identification, it can be determined whether the object to which the information is sent by the server is the control terminal itself by the third identification to ensure the accuracy of the information.

In some embodiments of the present disclosure, after receiving the third identification sent by the designated user, the server may also generate a second binding relationship between the smart device identification and the third identification, and feed it back to the control terminal through the second identification. The third identification is used to describe the uniqueness of the control terminal. That is to say, after receiving the third identification sent by the designated user and determining the smart device identification of the smart device shipped corresponding to the purchase order of the designated user, the server may use the third identification and the smart device identification to generate the second binding relationship. That is, in this embodiment, the control terminal itself and the corresponding shipped smart device generate a binding relationship, and the server feeds the second binding relationship back to the control terminal through the second identification.

According to the received second binding relationship, the control terminal can determine whether an object to which the information is sent by the server controls the terminal by the second binding relationship. In a case that the object controls the terminal, the second binding relationship is stored and the smart device identification from the second binding relationship is acquired. In a case that the object does not control the terminal, the second binding relationship is not stored, and it can be fed back to the server to send an error message.

In some embodiments of the present disclosure, the server may also generate a third binding relationship based on the smart device identification, the second identification, and the third identification, and feed the third binding relationship back to the control terminal through the second identification.

In some embodiments of the present disclosure, the smart device identification is set on an outer surface of the smart device or a packaging of the smart device. For example, the smart device identification is printed or labeled on the outer surface of the smart device. For another example, a pattern or a label describing the smart device identification is printed or labeled on the outer surface of the smart device. For example, the smart device identification is printed or labeled on a packaging of the smart device. For another example, a pattern or a label describing the smart device identification is printed or labeled on a packaging of the smart device. For other example, an attachment printed or labeled with the smart device identification or a pattern describing the smart device identification is included in a packaging of the smart device, such as Instruction Book, Product Card, Label, Signage, etc.

In some embodiments of the present disclosure, the smart device identification may be a product serial number. The manufacturer prints the product serial number on the outer surface of the smart device, the packaging of the smart device, or attaches it on the outer surface, on the packaging, or inside the packaging of the smart device by printing on the label, the Signage, the Instruction Book or the Product Card. The user of the smart device can compare the received serial number sent by the server with the above-mentioned serial number to determine whether the delivered smart device is the target device.

In another possible implementation of the present disclosure, the control terminal can get an image with a serial number through an image capturing function, obtains the serial number through a recognition algorithm, and matches it with the received serial number to determine whether the delivered smart device is the target device.

In some embodiments of the present disclosure, the manufacturer compiles the product serial number into a barcode, QR code, RFID, etc. The barcode, QR code, RFID can be printed on the outer surface of the smart device, or a Barcode label, a QR code label, a RFID label is pasted on the outer surface of the smart device, or the above label can be pasted on the packaging of the smart device. For example, the Barcode, QR code, RFID can be printed or pasted on the attached Instruction Book, Product Card, Signage, etc. by the way of labeling. The control terminal can be loaded with a scanner or reader, so as to scan or read the Barcode, QR code, RFID, acquire the serial number of the smart device, and match it with the received serial number to determine whether the delivered smart device is the target device.

It can be understood that steps 201 and 202 of this embodiment may be executed after step 101 in the embodiment shown in FIG. 1, or may be executed after step 102. Furthermore, step 201 may also be executed simultaneously with step 101, and step 202 may also be executed simultaneously with step 102.

In the above method provided by the exemplary embodiment shown in FIG. 2, in addition to writing the network configuration information notification included in the purchase order of the designated user into the smart device shipped according to the purchase order, the server also sends the smart device identification of the shipped smart device to the control terminal of the user of the smart device, and the user of the smart device is capable to acquire a smart device identification of the upcoming smart device in advance, and determine whether it matches after the smart device is delivered.

After determining that the smart device is the target device, the network configuration information is sent to the smart device to enable the smart device automatically access a network according to the network configuration information after receiving the network configuration information. In this way, whether the smart device is the target device is confirmed before it accessing the network. In a case that the delivered smart device is the target device, the user starts the smart device. When the smart device is powered on for the first time, it can access a corresponding network according to the written network configuration information. The entire process does not require manual operations by the user, which is fast and convenient, but can determine whether the smart device is the target device before accessing the network, which can improve network security and avoid accessing of unknown smart devices.

Figure 3:
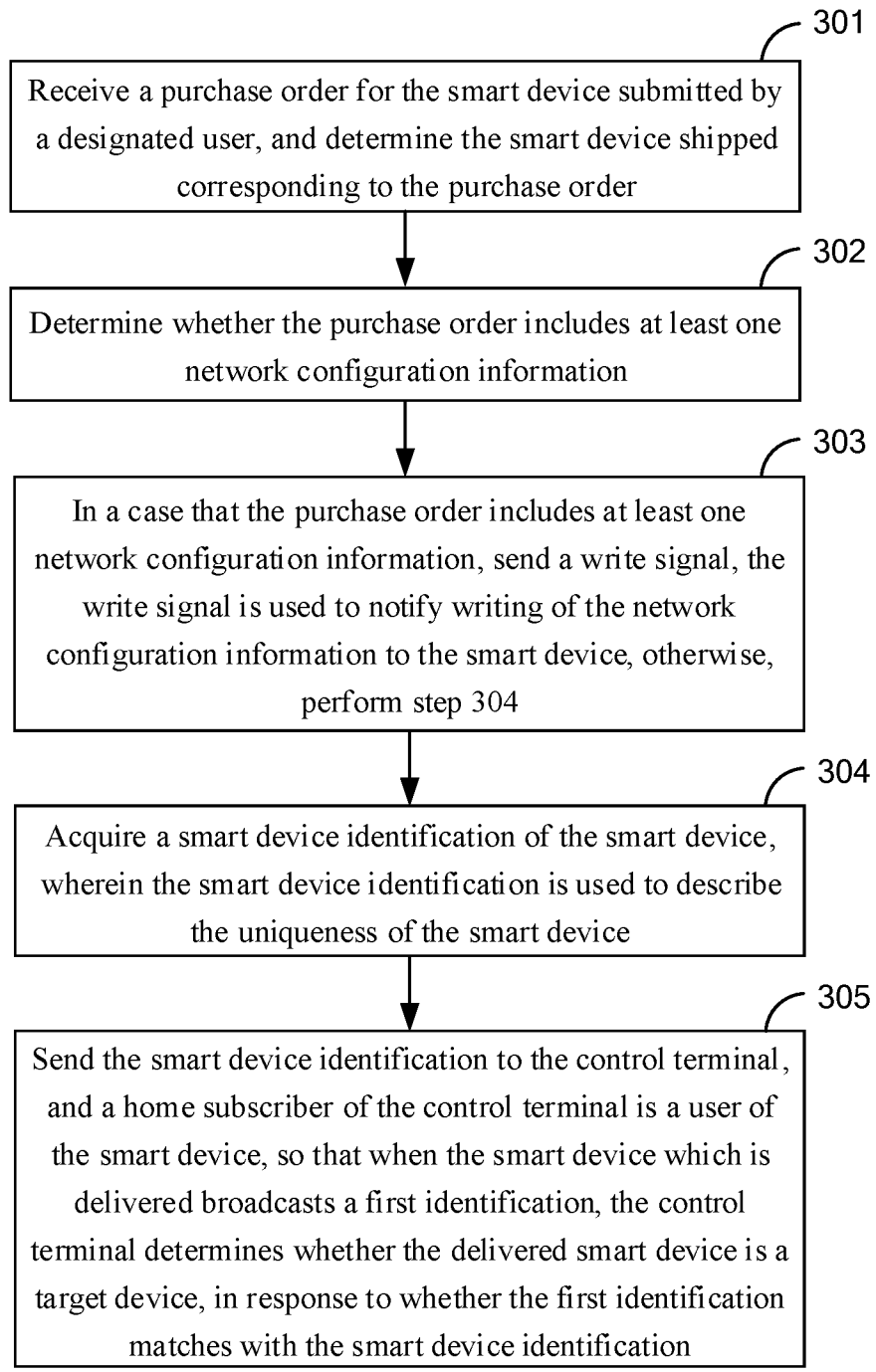
FIG. 3 shows a flowchart of another method for enabling a smart device to access a network according to an embodiment.

FIG. 3 shows a flowchart of another method for enabling a smart device to access a network according to an embodiment. Based on the description of the embodiment shown in FIG. 1, this embodiment makes illustration by using an example of how to quickly access a network when the network configuration information is not written into the smart device. As shown in FIG. 3, the method for enabling a smart device to access a network includes steps 301 to 305.

At the step 301, a purchase order for the smart device submitted by a designated user is received, and a smart device shipped corresponding to the purchase order is determined.

At the step 302, whether the purchase order includes at least one network configuration information is determined.

At the step 303, in a case that the purchase order includes at least one network configuration information, a write signal is sent and the write signal is used to notify writing of the network configuration information to the smart device, while in a case that the purchase order does not include at least one network configuration information, step 304 is performed.

In this step, in response to the purchase order which includes at least one network configuration information, the server sends the write signal, the write signal is used to notify writing of the network configuration information to the smart device, so that the smart device accesses a network according to the network configuration information. The possible implementation manner may be the same as the related implementation manner in the above-mentioned embodiment of FIG. 2, and details will not be described herein again.

At the step 304, a smart device identification of the smart device is acquired, wherein the smart device identification is used to describe the uniqueness of the smart device.

The smart device identification in this step is the same as the related technology of the smart device identification in the foregoing embodiment, and details will not be described herein again.

At the step 305, the smart device identification is sent to the control terminal, and the home subscriber of the control terminal is the user of the smart device, so that when a delivered smart device broadcasts a first identification, the control terminal determines that whether the delivered smart device is a target device, in response to the matching of the first identification with the identification of the smart device.

In this step, the first identification refers to the smart device identification of the smart device that is broadcast to the control terminal when the smart device is delivered, the first identification is an identification used to describe the uniqueness of the smart device, and the smart device identification is an identification used to describe the unique of this kind of smart devices, that is, each smart device has a unique smart device identification.

In a case that the network configuration information is not included in the purchase order of the designated user, there is no need to write the network configuration information to the smart device. In response to not receiving the network configuration information sent by the designated user, it would be enough for the server feeding a corresponding smart device identification of the delivered smart device back to the control terminal. When the smart device is delivered, the user can start the smart device. When the smart device is powered on for the first time, the smart device will broadcast its own smart device identification in a certain range based on the broadcast protocol, so as to be received by devices in this range. The first identification broadcasted by the smart device is received by the above control terminal.

In some embodiments of the present disclosure, the smart device may broadcast based on Bluetooth protocol, for example, Bluetooth beacon protocol. The smart device may also broadcast based on ZigBee protocol or Wi-Fi protocol. The present disclosure does not make specific limitations about this. It should be understood that the smart device can broadcast without establishing a connection with the control terminal.

After receiving the first identification broadcast by the smart device, the control terminal can call the stored smart device identifications to match with the first identification. Whether the smart device can be treated as a target device is determined by whether the matching is successful. That is, in a case that the matching is successful, i.e., the first identification of the smart device is consistent with a smart device identification stored in the control terminal, it is determined that the smart device is the target device; in a case that the matching fails, i.e., the first identification of the smart device is not consistent with a smart device identification stored in the control terminal, it is determined that the smart device is not the target device. When the smart device is the target device, that is to say, the smart device is capable to access the current network. In this way, the security of accessing a network can be effectively improved.

After determining that the smart device is the target device, the control terminal automatically establishes the communication connection with the smart device and sends the network configuration information, such as SSID and authentication password, to the smart device. The smart device receives the network configuration information sent by the control terminal, and accesses a network according to the network configuration information.

In some embodiments of the present disclosure, the communication connection that the control terminal automatically establishes with the smart device may be a short-range communication connection. The short-range communication may be any communication protocol such as Bluetooth, ZigBee, Wi-Fi, Soft AP, NFC, infrared, etc., and includes but is not limited to the above communication protocol. The disclosure does not make specific limitations about this.

In the above method provided by the exemplary embodiment shown in FIG. 3, if the designated user's purchase order includes the network configuration information, the server sends the write signal to notify writing of the network configuration information to the smart device corresponding to the purchase order, so that when the smart device reaches a coverage range of the network corresponding to the network configuration information and is powered on for the first time, the smart device is possible to access the network according to the written network configuration information, and the entire process does not require manual operations by the user, which is more fast and convenient.

In a case that the purchase order of the designated user does not include the network configuration information, the server can acquire the smart device identification of the smart device and send it to the control terminal of the user of the smart device. When the smart device is delivered and is powered on for the first time, it broadcasts the first identification describing its uniqueness based on a broadcast protocol. After the control terminal receiving the first identification of the smart device, it can perform a match of the first identification with the stored smart device identification to determine whether the smart device is a target device. When the smart device is determined to be the target device by matching, the control terminal establishes a communication connection with the smart device and sends network configuration information to the smart device, so that the smart device automatically accesses a network according to the network configuration information after receiving the network configuration information. In this way, when the smart device is powered on, the control terminal automatically sends the network configuration information to the smart device after determining that the smart device is the target device. The smart device accesses the network according to the received network configuration information, and the entire process does not require any manual operation by the user, which is fast and convenient.

The various technical features in the above embodiments can be combined arbitrarily, as long as there is no conflict or contradiction in combinations between the features, but they are not described one by one due to the limited space.

Figure 4:
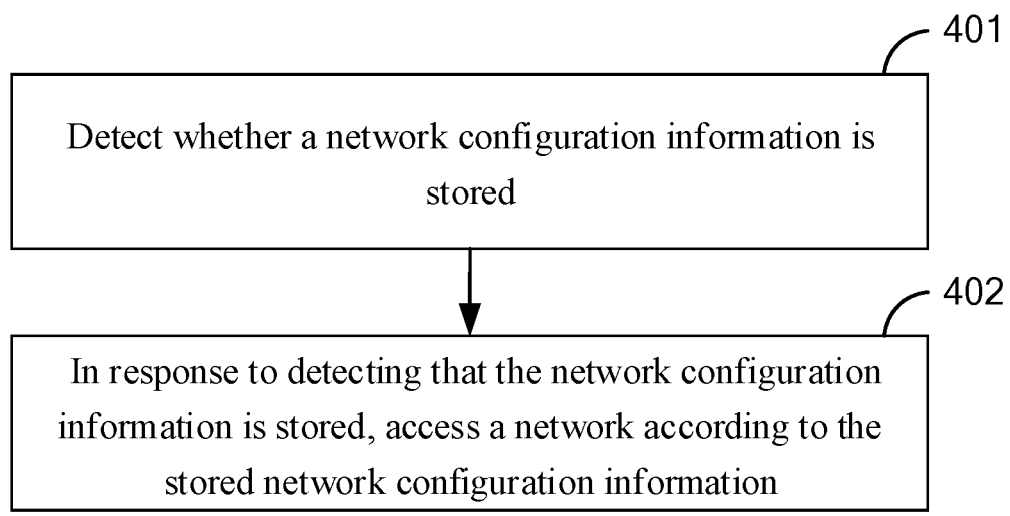
FIG. 4 shows a flowchart of a network access method according to an embodiment.

FIG. 4 shows a flowchart of a network access method according to an embodiment. The network access method is applied to a smart device. Based on the description of the embodiment shown in FIG. 1, the network access method includes steps 401 to 402, as shown in FIG. 4.

At the step 401, it is detected whether the network configuration information is stored.

In this step, when the smart device is powered on for the first time, it is detected whether the smart device itself has stored at least one network configuration information.

In some embodiments of the present disclosure, before the smart device is shipped, the writing device may write network configuration information of the network necessary to be accessed into the smart device according to the information of the received purchase order. In another possible scenario, when the smart device is produced, the writing device writes the network configuration information of the network that needs to be accessed into the smart device according to the information of the received purchase order.

At the step 402, in response to detecting the stored network configuration information, a network is accessed according to the stored network configuration information.

In this step, in a case that the smart device detects that the smart device itself stores network configuration information, it accesses the network according to the network configuration information to achieve fast access. In a case that no stored network configuration information is detected, a first identification describing its uniqueness is broadcast based on the broadcast protocol to acquire the network configuration information required to access the Internet of Things.

In the above method provided by the exemplary embodiment shown in FIG. 4, the smart device detects whether it stores the network configuration information, when the smart device detects its stored network configuration information, it accesses a network according to the stored network configuration information. The entire process does not require interaction with the control terminal or user input operation to obtain network configuration information, which is faster and more convenient.

Figure 5:
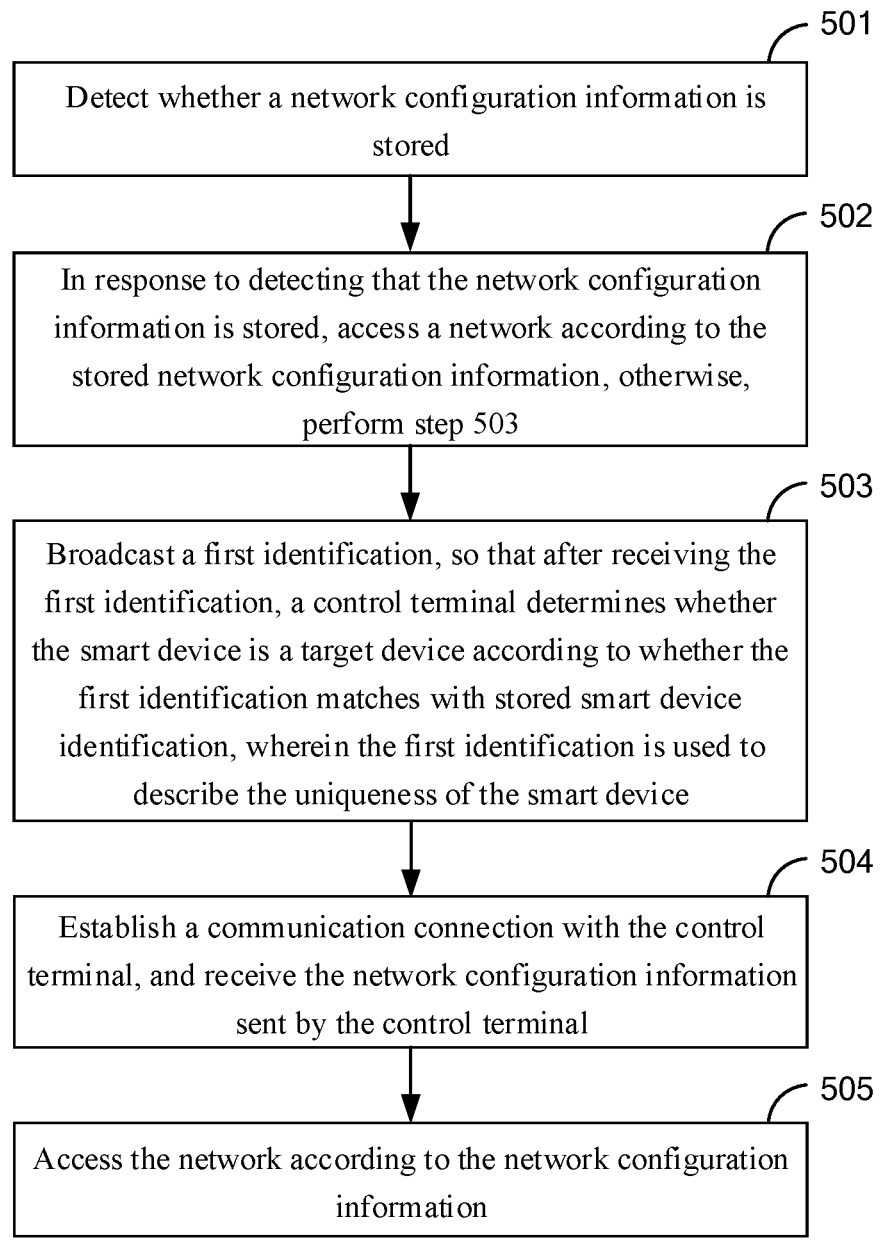
FIG. 5 shows a flowchart of a network access method according to an embodiment.

FIG. 5 shows a flowchart of a network access method according to an embodiment. The network access method is applied to a smart device. Based on the description of the embodiment shown in FIG. 4, this network access method includes steps 501 to 505, as shown in FIG. 5.

At the step 501, it is detected whether the network configuration information is stored.

At the step 502, in response to detecting the stored network configuration information, the network is accessed according to the stored network configuration information; otherwise, i.e., it is detected that the network configuration information is not stored, perform the step 503.

Steps 501 to 502 have the same related technologies as in the above steps 401 to 402, and are not repeated herein.

At step 503, a first identification is broadcast, so that after receiving the first identification, the control terminal determines whether the smart device is a target device in response to whether the first identification is matched with the stored smart device identification, wherein the first identification is used to describe the uniqueness of the smart device.

In this step, when the smart device is powered on for the first time, after detecting that the smart device itself does not store network configuration information, in response to that the smart device does not store the network configuration information, it broadcasts a first identification describing its uniqueness based on a broadcast protocol, so that after the control terminal receives the first identification of the smart device, the first identification is compared with the stored smart device identification to determine whether the smart device is the target device.

At the step 504, a communication connection with the control terminal is established, and network configuration information sent by the control terminal is received.

In this step, after the control terminal determines that the smart device is the target device, the control terminal automatically initiates the establishment of a communication connection with the smart device. At this time, the smart device accepts a connection request of the control terminal, establishes the communication connection with the control terminal, and receives the network configuration information sent by the control terminal.

At the step 505, the smart device accesses a network according to the network configuration information.

In this step, the smart device accesses the corresponding network according to the received network configuration information.

In the above method provided by the embodiment shown in FIG. 5, the smart device detects whether the smart device itself stores the network configuration information, and when it is detected that the network configuration information is not stored, the smart device broadcasts the first identification describing its uniqueness based on a broadcast protocol, so that after receiving the first identification of the smart device, the control terminal may make a match of the first identification and the stored smart device identification to determine whether the smart device is a target device. When it is determined that the smart device is the target device through matching, the control terminal establishes a communication connection with the smart device and sends network configuration information to the smart device, so that the smart device automatically accesses a network according to the network configuration information after receiving the network configuration information.

In this way, when the smart device is powered on, the control terminal automatically sends the network configuration information to the smart device after determining that the smart device is the target device, and the smart device accesses the network according to the received network configuration information. The entire process does not require manual operation by the user, which is fast and convenient. When the smart device detects that it has stored network configuration information itself, it accesses the network according to the stored network configuration information. The entire process does not require interaction with the control terminal or user input operation to obtain network configuration information, which is faster and more convenient.

Figure 6:
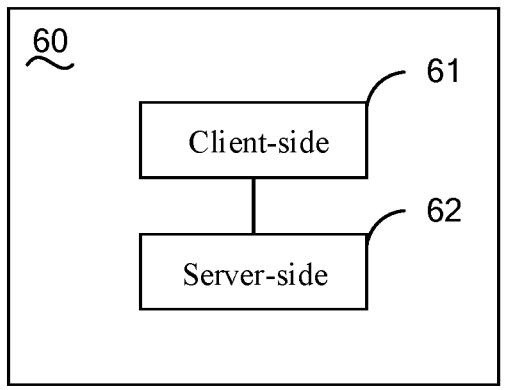
FIG. 6 shows a structural block diagram of an online shopping system according to an embodiment.

FIG. 6 is a structural block diagram of an online shopping system 60 shown in an embodiment of the present disclosure. As shown in FIG. 6, the system includes a client-side 61 and a server-side 62.

The client-side 61 is used for making a designated user to submit a purchase order for a smart device to the server-side 62.

The server-side 62 is used for receiving the purchase order for the smart device submitted by the designated user and determining a smart device shipped corresponding to the purchase order.

The server-side 62 is also used for, in response to the purchase order which includes at least one network configuration information, sending a write signal, and the write signal is used to notify writing of the network configuration information to the smart device, so as to allow the smart device to access to a network according to the network configuration information.

The online shopping system in this embodiment has same related technology of the online shopping system as in any of the above embodiments, and will not be repeated herein.

Figure 7:
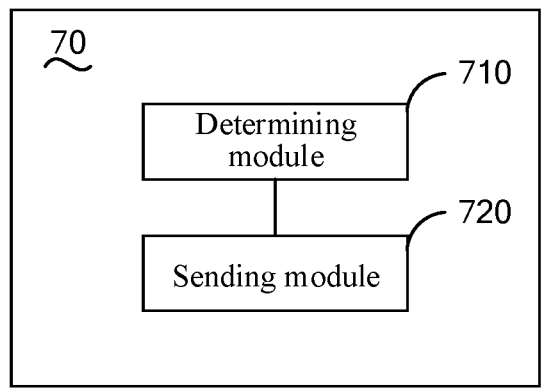
FIG. 7 shows a structural block diagram of an apparatus for enabling a smart device to access a network according to an embodiment.

FIG. 7 is a structural block diagram of an apparatus for enabling a smart device to access a network shown in an embodiment of the present disclosure. The apparatus for enabling a smart device to access a network may be applied to a server of the online shopping system. As shown in FIG. 7, the apparatus 70 includes a determining module 710 and a sending module 720.

The determining module 710 is configured to receive a purchase order for the smart device submitted by a designated user and determine a smart device shipped corresponding to the purchase order.

The sending module 720 is configured to, in response to the purchase order which includes at least one network configuration information, send a write signal, and the write signal is used to notify writing of the network configuration information to the smart device, so as to allow the smart device to access a network according to the network configuration information.

In an optional embodiment, the apparatus further includes a first acquiring module.

The first acquiring module is used for acquiring a smart device identification of the smart device, and the smart device identification is used to describe the uniqueness of the smart device.

The sending module 720 is further used for sending the smart device identification to a control terminal, and a home subscriber of the control terminal is a user of the smart device, so that the user or the control terminal determines whether the delivered smart device is a target device according to the smart device identification.

In an optional embodiment, the smart device identification is provided on an outer surface of the smart device or a packaging of the smart device.

In an optional embodiment, the apparatus further includes a second acquiring module.

The second acquiring module is configured to acquire a smart device identification of the smart device in response to the purchase order which does not include the network configuration information, and the smart device identification is used to describe the uniqueness of the smart device.

The sending module is also used for sending the smart device identification to the control terminal, and a home subscriber of the control terminal is a user of the smart device, so that when the delivered smart device broadcasts a first identification, the control terminal determines whether the delivered smart device is a target device, in response to whether the first identification matches with the identification of the smart device.

It can be understood that the first acquiring module and the second acquiring module may be the same module.

In an optional embodiment, the purchase order includes a second identification, and the second identification is used to describe the uniqueness of the home subscriber of the control terminal, and the sending module is used for sending the smart device identification to the control terminal through the second identification.

Figure 8:
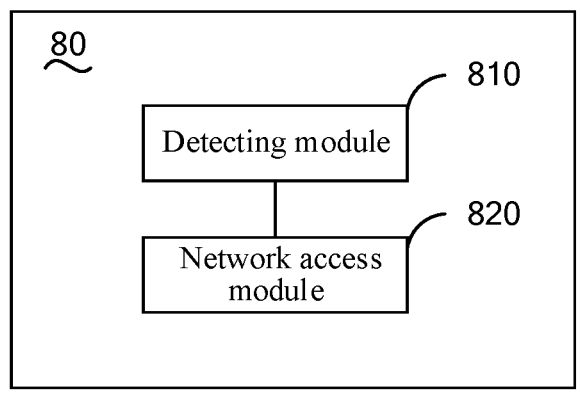
FIG. 8 shows a structural block diagram of a network access apparatus according to an embodiment.

According to a fifth aspect of the embodiments of the present disclosure, a network access apparatus is provided. FIG. 8 is a structural block diagram of a network access apparatus shown in an embodiment of the present disclosure. The network access apparatus may be applied to smart devices. As shown in FIG. 8, the network access apparatus 80 includes a detecting module 810 and a network access module 820.

The detecting module 810 is used for detecting whether network configuration information is stored.

The network access module 820 is used for accessing a network according to the stored network configuration information when the stored network configuration information is detected.

In an optional embodiment, the apparatus further includes a broadcasting module and a connection establishing module.

The broadcasting module is used for broadcasting a first identification in response to a detection result that the network configuration information is not stored, so that after receiving the first identification, a control terminal determines whether the smart device is a target device according to whether the first identification matches with the stored smart device identification, wherein the first identification is used to describe the uniqueness of the smart device.

The connection establishing module is used for establishing a communication connection with the control terminal and receiving the network configuration information sent by the control terminal.

The network access module is used for accessing a network according to the received network configuration information.

Regarding the apparatuses in the above embodiments, the specific manners in which the respective modules perform operations have been described in detail in the embodiments related to the method, and will not be elaborated herein.

Figure 9:
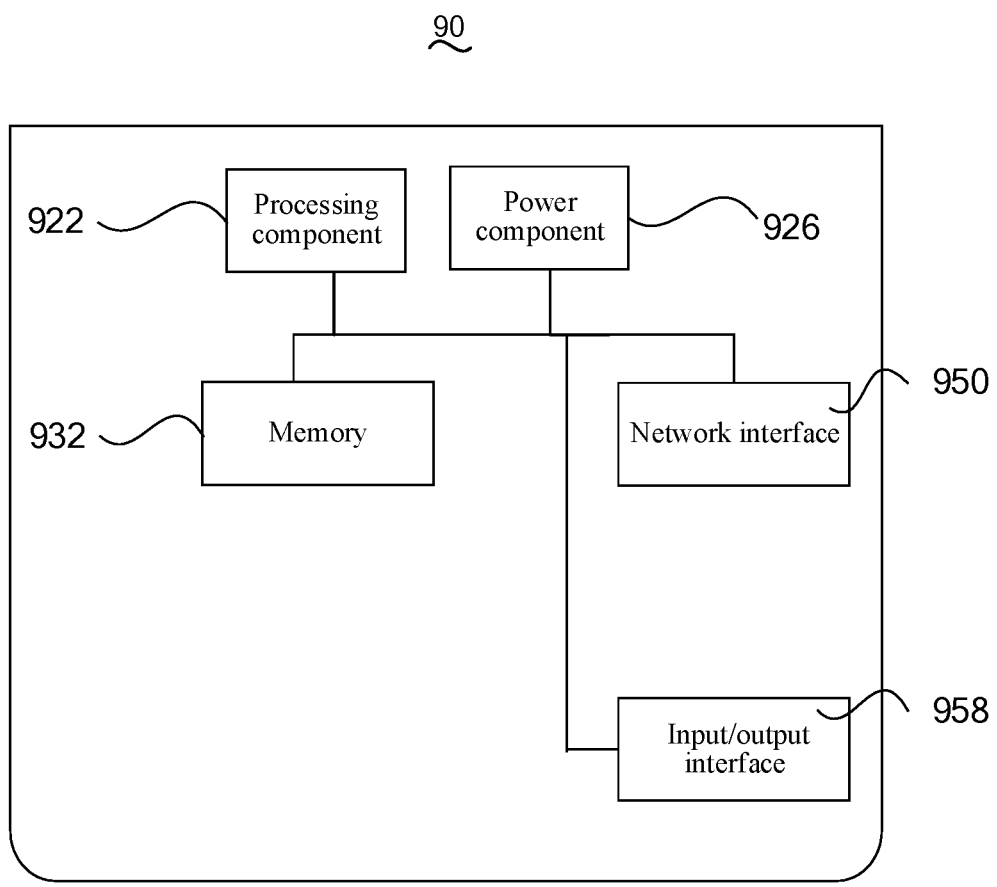
FIG. 9 shows a schematic structural diagram of a computer device according to an embodiment.

FIG. 9 is a schematic structural diagram of a computer device shown in an embodiment of the present disclosure. As shown in FIG. 9, an apparatus 90 for enabling a smart device to access a network is shown according to an embodiment. For example, the apparatus 90 may be provided as an electronic device, for example, a server of an online shopping system. Referring to FIG. 9, the apparatus 90 includes a processing component 922, which further includes one or more processors, and memory resources represented by the memory 932. The memory resources are used for storing instructions executable by the processing component 922, such as application programs. The application programs stored in the memory 932 may include one or more modules, each corresponding to a set of instructions. In addition, the processing component 922 is configured to execute instructions to perform the method mentioned above for enabling the smart device of the server of the online shopping system to access the network.

The apparatus 90 may also include a power component 926 configured to perform power management of the apparatus 90, a wired or wireless network interface 950 configured to connect the apparatus 90 to the network, and an input/output (I/O) interface 958. The apparatus 90 may operate based on an operating system stored in the memory 932, such as Android, IOS, WindowsServer™, Mac OS X™, Unix™, Linux, FreeBSD™ or the like.

When the instructions in the memory 932 are executed by the processing component 922, the apparatus 90 can perform another method for enabling a smart device to access a network, which includes:

receiving a purchase order for the smart device submitted by a designated user and determining a smart device shipped corresponding to the purchase order; and in response to that the purchase order which includes at least one network configuration information, sending a write signal, and the write signal is used to notify writing of the network configuration information to the smart device, so as to allow the smart device to access to a network according to the network configuration information.

Figure 10:
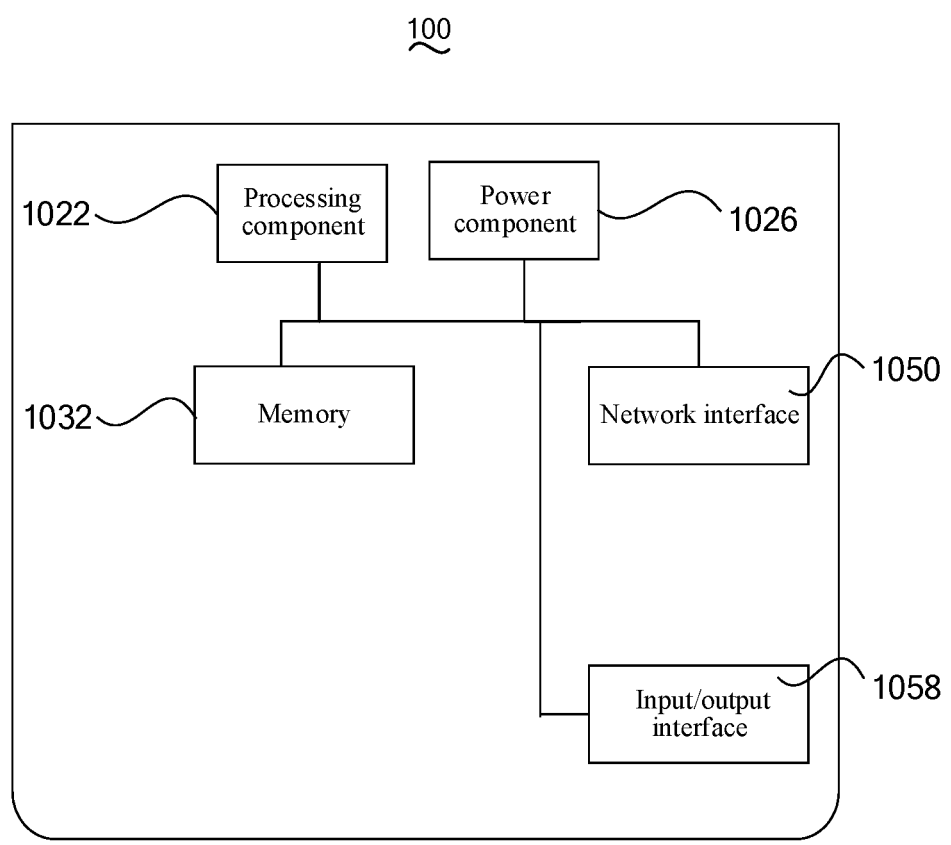
FIG. 10 shows a schematic structural diagram of a smart device according to an embodiment.

FIG. 10 is a schematic structural diagram of a smart device shown in an embodiment of the present disclosure.

As shown in FIG. 10, a network access apparatus 100 according to an embodiment is shown. For example, the apparatus 100 may be provided as a smart device, for example, a smart home appliance, a smart medical device, a smart car, a smart home device, a smart door lock, etc., which is not specifically limited in this disclosure.

Referring to FIG. 10, the apparatus 100 includes a processing component 1022, which further includes one or more processors, and memory resources represented by the memory 1032, for storing instructions executable by the processing component 1022, such as application programs. The application programs stored in the memory 1032 may include one or more modules, each corresponding to a set of instructions. In addition, the processing component 1022 is configured to execute instructions to perform the above-described method for enabling the smart device to access the server of the online shopping system.

The apparatus 100 may also include a power component 1026 configured to perform power management of the apparatus 100, a wired or wireless network interface 1050 configured to connect the apparatus 100 to the network, and an input/output (I/O) interface 1058. The apparatus 100 can operate based on an operating system stored in the memory 1032, such as Android, IOS, WindowsServer™, Mac OS X™, Unix™, Linux, FreeBSD™ or the like.

When the instruction in the memory 1032 is executed by the processing component 1022, the apparatus 100 is capable to perform another method for enabling a smart device to access a network. The method includes:

detecting whether the network configuration information is stored; and accessing a network according to the stored network configuration information in response to detecting that the network configuration information is stored.

Various embodiments of the present disclosure provide a computer-readable storage medium having a computer program stored thereon, and when the program is executed by a processor, the following steps are realized:

receiving the purchase order for the smart device submitted by a designated user and determining a smart device shipped corresponding to the purchase order, in response to the purchase order which includes at least one network configuration information, sending a write signal, and the write signal is used to notify writing of the network configuration information to the smart device, so as to allow the smart device to access to a network according to the network configuration information; or, detecting whether the network configuration information is stored, accessing a network according to the stored network configuration information in response to detecting that the network configuration information is stored.

The apparatus embodiments can correspond to the method embodiments, the relevant parts can be referred to the description of the method embodiments. The apparatus embodiments described above are only schematic, wherein the modules described as separate components may or may not be physically separated, and the components displayed as modules may or may not be physical modules, that is, may be located in one place, or can be distributed to multiple network modules. Some or all of the modules may be selected according to actual needs to achieve the objectives of the disclosed solutions.

For example, in some embodiments, the method further comprising:

acquiring a smart device identification of the smart device, and the smart device identification is used to describe uniqueness of the smart device; and sending the smart device identification to a control terminal, and a home subscriber of the control terminal is a user of the smart device, so that the user or the control terminal determines whether the smart device which is delivered is a target device according to the smart device identification.

In some embodiments, the smart device identification is provided on an outer surface of the smart device or a packaging of the smart device.

In some embodiments, the method further comprising:

in response to the purchase order does not include network configuration information, acquiring a smart device identification of the smart device, and the smart device identification is used to describe uniqueness of the smart device;

sending the smart device identification to the control terminal, and a home subscriber of the control terminal is a user of the smart device, so that when the smart device which is delivered broadcasts a first identification, the control terminal determines whether the delivered smart device is a target device, in response to whether the first identification matches with the smart device identification.

In some embodiments, the purchase order comprises a second identification and the second identification is used to describe uniqueness of the home subscriber of the control terminal, wherein the step of sending the smart device identification to the control terminal comprising:

sending the smart device identification to the control terminal through the second identification.

In some embodiments, the network access method further comprising:

in response to detecting that the network configuration information is not stored, broadcasting a first identification, so that after receiving the first identification, a control terminal determines whether the smart device is a target device according to whether the first identification matches with stored smart device identification, wherein the first identification is used to describe uniqueness of the smart device;

establishing a communication connection with the control terminal and receiving the network configuration information sent by the control terminal; and accessing the network according to the received network configuration information.

In some embodiments, the apparatus further comprising:

a first acquiring module, configured to acquire a smart device identification of the smart device, and the smart device identification is used to describe uniqueness of the smart device;

the sending module is further configured to send the smart device identification to a control terminal, and a home subscriber of the control terminal is a user of the smart device, so that the user or the control terminal determines whether the smart device which is delivered is a target device according to the smart device identification.

In some embodiments, the smart device identification is provided on an outer surface of the smart device or a packaging of the smart device.

In some embodiments, the apparatus further comprising:

a second acquiring module, configured to acquire a smart device identification of the smart device in response to the purchase order does not include the network configuration information, and the smart device identification is used to describe uniqueness of the smart device;

wherein the sending module is further configured to send the smart device identification to the control terminal, and a home subscriber of the control terminal is a user of the smart device, so that when the smart device which is delivered broadcasts a first identification, the control terminal determines whether the delivered smart device is a target device, in response to whether the first identification matches with the smart device identification.

In some embodiments, the purchase order comprises a second identification configured to describe uniqueness of the home subscriber of the control terminal, and the sending module is configured to send the smart device identification to the control terminal through the second identification.

In some embodiments, the apparatus further comprises:

a broadcasting module, configured to in response to a detection result that the network configuration information is not stored, broadcast a first identification, so that after receiving the first identification, a control terminal determines whether the smart device is a target device, according to whether the first identification matches with stored smart device identification, wherein the first identification is used to describe uniqueness of the smart device; and a connection establishing module, configured to establish a communication connection with the control terminal and receive the network configuration information sent by the control terminal.

the network access module is configured to access the network according to the received network configuration information.

Various embodiments of the present disclosure can have one or more of the following advantages.

When a designated user submits an order to purchase a smart device on an online shopping system, the server of the online system may determine the smart device to be shipped based on the purchase order of the designated user which is received. When the server detected that the purchase order submitted by the designated user includes network configuration information of a network that at least one smart device will access in the future, a write signal is sent to notify writing of the network configuration information to a corresponding shipped smart device. When the smart device reaches a delivery place on the purchase order, i.e. when the smart device reaches a coverage range of the network corresponding to the network configuration information, and the user starts the smart device (that is the smart device is powered on for the first time), the smart device is capable to automatically access a network according to the written network configuration information. In this way, the smart device can automatically access a network after it is powered on for the first time, and the entire process does not require manual operation by the user, which is faster and more convenient.

In this way, when the smart device reaches a deliver place on the purchase order, i.e. when the smart device reaches a coverage range of the network corresponding to the network configuration information, the user starts the smart device, the smart device is powered on for the first time and the smart device is capable to automatically access the network according to the written network configuration information. In this way, the smart device can automatically access a network after it is powered on for the first time, and the entire process does not require manual operation by the user, which is faster and more convenient.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for enabling a smart device to access a network, which is applied to a server of an online shopping system, the method comprising:
   receiving a purchase order for the smart device submitted by a designated user, and determining the smart device shipped corresponding to the purchase order;
   in response to determining that the purchase order includes at least one network configuration information, sending a write signal to the smart device to make the network configuration information to be written to the smart device, so as to enable the smart device to access a network according to the network configuration information; and
   in response to determining that the purchase order does not include network configuration information, acquiring a smart device identification of the smart device and sending the smart device identification to a control terminal, wherein the smart device identification is configured to describe uniqueness of the smart device and a home subscriber of the control terminal is a user of the smart device, so that when the smart device which is delivered broadcasts a first identification, the control terminal, in response to whether the first identification matches with the smart device identification, determines whether the delivered smart device is a target device.

2. The method according to claim 1, further comprising:
in response to determining that the purchase order includes at least one network configuration information, acquiring the smart device identification of the smart device; and
sending the smart device identification to the control terminal, wherein the home subscriber of the control terminal is the user of the smart device, so that the user or the control terminal determines whether the smart device which is delivered is a target device according to the smart device identification.

3. The method according to claim 2, wherein the smart device identification is provided on an outer surface of the smart device or a packaging of the smart device.

4. The method according to claim 3, wherein the purchase order comprises a second identification and the second identification is used to describe uniqueness of the home subscriber of the control terminal,
wherein the sending the smart device identification to the control terminal comprises:
sending the smart device identification to the control terminal through the second identification.

5. The method according to claim 2, wherein the purchase order comprises a second identification and the second identification is used to describe uniqueness of the home subscriber of the control terminal,
wherein the sending the smart device identification to the control terminal comprises:
sending the smart device identification to the control terminal through the second identification.

6. The method according to claim 1, wherein the purchase order comprises a second identification and the second identification is used to describe uniqueness of the home subscriber of the control terminal,
wherein the sending the smart device identification to the control terminal comprises:
sending the smart device identification to the control terminal through the second identification.

7. An online shopping system, wherein the online shopping system comprises a client-side and a server-side,
the client-side is configured for enabling a designated user to submit a purchase order for a smart device to the server-side;
the server-side is configured for receiving the purchase order for the smart device submitted by the designated user and determining the smart device shipped corresponding to the purchase order; and
the server-side is further configured for:
in response to determining that the purchase order includes at least one network configuration information, sending a write signal to the smart device to make the at least one network configuration information to be written to the smart device, so as to allow the smart device to access to a network according to the at least one network configuration information;
in response to determining that the purchase order does not include network configuration information, acquiring a smart device identification of the smart device and sending the smart device identification to a control terminal, wherein the smart device identification is configured to describe uniqueness of the smart device and a home subscriber of the control terminal is a user of the smart device, so that when the smart device which is delivered broadcasts a first identification, the control terminal, in response to whether the first identification matches with the smart device identification, determines whether the delivered smart device is a target device.

8. The online shopping system of claim 7, wherein the client-side is further configured to:
detect whether the network configuration information is stored; and
in response to detecting that the network configuration information is stored, accessing the network according to the stored network configuration information.

9. The online shopping system of claim 8, wherein the client-side is further configured to:
in response to detecting that the network configuration information is not stored, broadcast a first identification, such that after receiving the first identification, a control terminal determines whether the smart device is a target device according to whether the first identification matches with stored smart device identification, wherein the first identification is used to describe uniqueness of the smart device;
establish a communication connection with the control terminal and receive the network configuration information sent by the control terminal; and
access the network according to the received network configuration information.

10. An apparatus for enabling a smart device to access a network, which is applied to a server of an online shopping system, the apparatus comprising:
a processor; and
a memory device storing instructions for execution by the processor,
wherein the processor is configured to:
receive a purchase order for the smart device submitted by a designated user, and determine the smart device shipped corresponding to the purchase order; and
in response to determining that the purchase order includes at least one network configuration information, send a write signal to the smart device to make the network configuration information to be written to the smart device, so as to enable the smart device to access a network according to the network configuration information; and
in response to determining that the purchase order does not include network configuration information, acquire a smart device identification of the smart device and send the smart device identification to a control terminal, wherein the smart device identification is configured to describe uniqueness of the smart device and a home subscriber of the control terminal is a user of the smart device, so that when the smart device which is delivered broadcasts a first identification, the control terminal, in response to whether the first identification matches with the smart device identification, determines whether the delivered smart device is a target device.

11. The apparatus according to claim 10, wherein the processor is further configured to:
in response to determining that the purchase order includes at least one network configuration information, acquire the smart device identification of the smart device;
send the smart device identification to the control terminal, wherein the home subscriber of the control terminal is the user of the smart device, so that the user or the control terminal determines whether the smart device which is delivered is a target device according to the smart device identification.

12. The apparatus according to claim 11, wherein the smart device identification is provided on an outer surface of the smart device or a packaging of the smart device.

13. The apparatus according to claim 11, wherein the purchase order comprises a second identification and the second identification is used to describe the uniqueness of the home subscriber of the control terminal, and the processor is further configured to send the smart device identification to the control terminal through the second identification.

14. The apparatus according to claim 10, wherein the purchase order comprises a second identification; and wherein the second identification is used to describe the uniqueness of the home subscriber of the control terminal; and the processor is further configured to send the smart device identification to the control terminal through the second identification.

* * * * *